United States Patent
Konolige

(10) Patent No.: US 11,425,353 B1
(45) Date of Patent: Aug. 23, 2022

(54) DISPARITY INTERPOLATION REFINEMENT FOR STEREO VISION

(71) Applicant: X Development LLC, Mountain View, CA (US)

(72) Inventor: Kurt Konolige, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 505 days.

(21) Appl. No.: 15/355,285

(22) Filed: Nov. 18, 2016

(51) Int. Cl.
*H04N 13/128* (2018.01)
*H04N 13/111* (2018.01)

(52) U.S. Cl.
CPC ......... *H04N 13/128* (2018.05); *H04N 13/111* (2018.05)

(58) Field of Classification Search
USPC .......................................................... 348/43
See application file for complete search history.

(56) References Cited

U.S. PATENT DOCUMENTS

| | | | |
|---|---|---|---|
| 6,625,216 B1 * | 9/2003 | Zhu | G06T 7/238 |
| | | | 375/240.16 |
| 7,194,126 B2 * | 3/2007 | Konolige | G06T 7/20 |
| | | | 348/E13.008 |
| 2009/0073277 A1 * | 3/2009 | Numata | H04N 19/139 |
| | | | 348/222.1 |

OTHER PUBLICATIONS

R. Zabih, J. Woodfill, "Non-parametric Local Transforms for Computing Visual Correspondence, Lecture Notes in Computer Science," vol. 801, pp. 151-158, Computer Vision—ECCV '94 (1994).

Martin Humenberger, Tobias Engelke, Wilfried Kubinger, "A Census-Based Stereo Vision Algorithm Using Modified Semi-Global Matching and Plane Fitting to Improve Matching Quality," AIT Austrian Institute of Technology Donau-City-Strasse 1, 1220 Vienna, Austria, pp. 1-8.

Masao Shimizu and Masatoshi Okutomi, "Sub-Pixel Estimation Error Cancellation on Area-Based Matching," Graduate School of Science and Engineering, Tokyo Institute of Technology, 2-12-1 Ookayama, Meguro-ku, Tokyo, 152-8550, Japan, Received Jul. 29, 2004; Revised Nov. 23, 2004; Accepted Nov. 23, 2004 First online version published in Apr. 2005.

\* cited by examiner

*Primary Examiner* — Mikhail Itskovich
(74) *Attorney, Agent, or Firm* — McDonnell Boehnen Hulbert & Berghoff LLP

(57) ABSTRACT

An example method includes receiving first and second images from a first and second imager. The method further includes determining first correlation scores between a target pixel from the first image and respective pixels from the second image based on a first similarity measure. The method also includes identifying a candidate matching pixel to the target pixel based on the first correlation scores. The method further includes determining second correlation scores between the target pixel and each of the candidate matching pixel, a left neighboring pixel, and a right neighboring pixel based on a second similarity measure. The method also includes determining whether the candidate matching pixel is better correlated to the target pixel than each of the neighboring pixels based on the second correlation scores. After determining that the candidate matching pixel is better correlated, the method further includes determining a disparity value by interpolating the second correlation scores.

16 Claims, 12 Drawing Sheets

302

| 59 | 67 | 78 | 79 | 96 |
|----|----|----|----|----|
| 64 | 65 | 87 | 94 | 95 |
| 63 | 63 | 88 | 93 | 97 |
| 69 | 72 | 76 | 95 | 98 |
| 70 | 75 | 78 | 92 | 99 |

210

304

| 53 | 56 | 58 | 77 | 86 | 95 | 105 |
|----|----|----|----|----|----|----|
| 56 | 58 | 64 | 84 | 89 | 91 | 85 |
| 63 | 62 | 61 | 85 | 87 | 88 | 86 |
| 54 | 57 | 74 | 78 | 86 | 93 | 107 |
| 52 | 56 | 67 | 79 | 84 | 95 | 109 |

0000100011001100011

312

0001100111111100111111100111
XOR
0000100011001100011

322

=000100010011000010000100

324

Hamming distance = 6

326

| 53 | 56 | 58 | 77 | 86 |
|----|----|----|----|----|
| 56 | 58 | 64 | 84 | 89 |
| 63 | 62 | 61 | 85 | 87 |
| 54 | 57 | 74 | 78 | 86 |
| 52 | 56 | 67 | 79 | 84 |

220

0001100011001100001
XOR
0000100011001100011

332

=000100000000000000010

334

Hamming distance = 2

336

| 56 | 58 | 77 | 86 | 95 |
|----|----|----|----|----|
| 58 | 64 | 84 | 89 | 91 |
| 62 | 61 | 85 | 87 | 88 |
| 57 | 74 | 78 | 86 | 93 |
| 56 | 67 | 79 | 84 | 95 |

230

0001100110001000011100011
XOR
0000100011001100011

342

=00010001010001000000000

344

Hamming distance = 4

346

| 58 | 77 | 86 | 95 | 105 |
|----|----|----|----|----|
| 64 | 84 | 89 | 91 | 85 |
| 61 | 85 | 87 | 88 | 86 |
| 74 | 78 | 86 | 93 | 107 |
| 67 | 79 | 84 | 95 | 109 |

DISPARITY INTERPOLATION REFINEMENT FOR STEREO VISION

BACKGROUND

Imaging devices are used in various types of systems and perform a variety of functions. Some imaging devices may be used for applications involving manufacturing, assembly, image analyses, and depth sensing, among others. Over time, the manner in which these imaging systems operate is becoming more robust, efficient, and intuitive. As imaging systems are integrated into numerous aspects of modern life, it is desirable for imaging systems to operate effectively under many different types of conditions. Therefore, a demand for robust and accurate imaging systems has led to advances in the various components that form imaging systems, as well as within the image processing techniques used to analyze and interpret data from images captured by imaging systems.

SUMMARY

Example embodiments are provided herein for disparity interpolation for stereo depth sensing. To determine the disparity between a target pixel in a first image and a given row in a second image, correlation scores may first be computed between the target pixel and pixels from the given row based on a first similarity measure. A candidate matching pixel for the target pixel may be identified based on these correlation scores. Additional correlation scores between the target pixel and each of the candidate matching pixel, a left neighboring pixel, and a right neighboring pixel may be computed based on a second similarity measure, which may be a more nuanced input feature than the first similarity measure. The candidate matching pixel may be confirmed to be the best-match pixel for the target pixel based on the additional correlation scores. A disparity value for the target pixel may then be computed based on an interpolation of the additional correlation scores.

In one example, a method is provided that includes receiving a first image from a first imager and a second image from a second imager. The method further includes determining first correlation scores between a target pixel from the first image and respective pixels from a given row of the second image based on a first similarity measure. The method additionally includes identifying a candidate matching pixel to the target pixel from the given row of the second image based on the first correlation scores. The method further includes determining second correlation scores between the target pixel and each of the candidate matching pixel, a left neighboring pixel of the candidate matching pixel, and a right neighboring pixel of the candidate matching pixel based on a second similarity measure. The method also includes determining whether the candidate matching pixel is better correlated to the target pixel than each of the left neighboring pixel of the candidate matching pixel and the right neighboring pixel of the candidate matching pixel based on the second correlation scores. After determining that the candidate matching pixel is better correlated to the target pixel than each of the left neighboring pixel of the candidate matching pixel and the right neighboring pixel of the candidate matching pixel based on the second correlation scores, the method further includes determining a disparity value between the target pixel from the first image and the given row of the second image based on an interpolation of the second correlation scores. The method additionally includes providing the disparity value between the target pixel from the first image and the given row of the second image.

In a further example, a system is provided that includes a first imager, a second imager, and a control system configured to receive a first image from the first imager and a second image from the second imager. The control system may be further configured to determine first correlation scores between a target pixel from the first image and respective pixels from a given row of the second image based on a first similarity measure. The control system may additionally be configured to identify a candidate matching pixel to the target pixel from the given row of the second image based on the first correlation scores. The control system may also be configured to determine second correlation scores between the target pixel and each of the candidate matching pixel, a left neighboring pixel of the candidate matching pixel, and a right neighboring pixel of the candidate matching pixel based on a second similarity measure. The control system may be further configured to determine whether the candidate matching pixel is better correlated to the target pixel than each of the left neighboring pixel of the candidate matching pixel and the right neighboring pixel of the candidate matching pixel based on the second correlation scores. After determining that the candidate matching pixel is better correlated to the target pixel than each of the left neighboring pixel of the candidate matching pixel and the right neighboring pixel of the candidate matching pixel based on the second correlation scores, the control system may be further configured to determine a disparity value between the target pixel from the first image and the given row of the second image based on an interpolation of the second correlation scores. The control system may also be configured to provide the disparity value between the target pixel from the first image and the given row of the second image.

In another example, a non-transitory computer readable medium is disclosed having stored therein instructions executable by one or more processors to cause a computing system to perform functions comprising receiving a first image from a first imager and a second image from a second imager. The functions may further include determining first correlation scores between a target pixel from the first image and respective pixels from a given row of the second image based on a first similarity measure. The functions may additionally include identifying a candidate matching pixel to the target pixel from the given row of the second image based on the first correlation scores. The functions may also include determining second correlation scores between the target pixel and each of the candidate matching pixel, a left neighboring pixel of the candidate matching pixel, and a right neighboring pixel of the candidate matching pixel based on a second similarity measure. The functions may further include determining whether the candidate matching pixel is better correlated to the target pixel than each of the left neighboring pixel of the candidate matching pixel and the right neighboring pixel of the candidate matching pixel based on the second correlation scores. The functions may also include after determining that the candidate matching pixel is better correlated to the target pixel than each of the left neighboring pixel of the candidate matching pixel and the right neighboring pixel of the candidate matching pixel based on the second correlation scores, determining a disparity value between the target pixel from the first image and the given row of the second image based on an interpolation of the second correlation scores. The functions may further include providing the disparity value between the target pixel from the first image and the given row of the second image.

In a further example, a system is disclosed that includes means for receiving a first image from a first imager and a second image from a second imager. The system further includes means for determining first correlation scores between a target pixel from the first image and respective pixels from a given row of the second image based on a first similarity measure. The system additionally includes means for identifying a candidate matching pixel to the target pixel from the given row of the second image based on the first correlation scores. The system further includes means for determining second correlation scores between the target pixel and each of the candidate matching pixel, a left neighboring pixel of the candidate matching pixel, and a right neighboring pixel of the candidate matching pixel based on a second similarity measure. The system also includes means for determining whether the candidate matching pixel is better correlated to the target pixel than each of the left neighboring pixel of the candidate matching pixel and the right neighboring pixel of the candidate matching pixel based on the second correlation scores. After determining that the candidate matching pixel is better correlated to the target pixel than each of the left neighboring pixel of the candidate matching pixel and the right neighboring pixel of the candidate matching pixel based on the second correlation scores, the system further includes means for determining a disparity value between the target pixel from the first image and the given row of the second image based on an interpolation of the second correlation scores. The system additionally includes means for providing the disparity value between the target pixel from the first image and the given row of the second image.

In an additional example, an example method is disclosed that includes receiving a first image from a first imager and a second image from a second imager. The method further includes providing the first image and the second image to stereo matching hardware. The method additionally includes receiving from the stereo matching hardware a candidate matching pixel to a target pixel of the first image from a given row of the second image. The method further includes determining correlation scores between the target pixel and each of the candidate matching pixel, a left neighboring pixel of the candidate matching pixel, and a right neighboring pixel of the candidate matching pixel based on a similarity measure. The method also includes determining whether the candidate matching pixel is better correlated to the target pixel than each of the left neighboring pixel of the candidate matching pixel and the right neighboring pixel of the candidate matching pixel based on the correlation scores. If the candidate matching pixel is better correlated to the target pixel than each of the left neighboring pixel of the candidate matching pixel and the right neighboring pixel of the candidate matching pixel, the method additionally includes determining a disparity value between the target pixel from the first image and the given row of the second image based on an interpolation of the correlation scores. If a neighboring pixel of the candidate matching pixel is better correlated to the target pixel than the candidate matching pixel, the method also includes determining a correlation score between the target pixel and a second neighboring pixel of the neighboring pixel that is opposite the candidate matching pixel based on the similarity measure, and determining the disparity value between the target pixel from the first image and the given row of the second image based on an interpolation of the second correlation scores for the neighboring pixel, the second neighboring pixel, and the candidate matching pixel. The method further includes providing the disparity value between the target pixel from the first image and the given row of the second image.

In a further example, a system is provided that includes a first imager, a second imager, and a control system configured to receive a first image from the first imager and a second image from the second imager. The control system may be further configured to provide the first image and the second image to stereo matching hardware. The control system additionally may be configured to receive from the stereo matching hardware a candidate matching pixel to a target pixel of the first image from a given row of the second image. The control system may be further configured to determine correlation scores between the target pixel and each of the candidate matching pixel, a left neighboring pixel of the candidate matching pixel, and a right neighboring pixel of the candidate matching pixel based on a similarity measure. The control system may also be configured to determine whether the candidate matching pixel is better correlated to the target pixel than each of the left neighboring pixel of the candidate matching pixel and the right neighboring pixel of the candidate matching pixel based on the correlation scores. If the candidate matching pixel is better correlated to the target pixel than each of the left neighboring pixel of the candidate matching pixel and the right neighboring pixel of the candidate matching pixel, the control system additionally may be configured to determine a disparity value between the target pixel from the first image and the given row of the second image based on an interpolation of the correlation scores. If a neighboring pixel of the candidate matching pixel is better correlated to the target pixel than the candidate matching pixel, the control system also may be configured to determine a correlation score between the target pixel and a second neighboring pixel of the neighboring pixel that is opposite the candidate matching pixel based on the similarity measure, and determine the disparity value between the target pixel from the first image and the given row of the second image based on an interpolation of the second correlation scores for the neighboring pixel, the second neighboring pixel, and the candidate matching pixel. The control system may be further configured to provide the disparity value between the target pixel from the first image and the given row of the second image.

In another example, a non-transitory computer readable medium is disclosed having stored therein instructions executable by one or more processors to cause a computing system to perform functions comprising receiving a first image from a first imager and a second image from a second imager. The functions may further include providing the first image and the second image to stereo matching hardware. The functions additionally include receiving from the stereo matching hardware a candidate matching pixel to a target pixel of the first image from a given row of the second image. The functions further include determining correlation scores between the target pixel and each of the candidate matching pixel, a left neighboring pixel of the candidate matching pixel, and a right neighboring pixel of the candidate matching pixel based on a similarity measure. The functions also include determining whether the candidate matching pixel is better correlated to the target pixel than each of the left neighboring pixel of the candidate matching pixel and the right neighboring pixel of the candidate matching pixel based on the correlation scores. If the candidate matching pixel is better correlated to the target pixel than each of the left neighboring pixel of the candidate matching pixel and the right neighboring pixel of the candidate matching pixel, the functions additionally include determining a disparity value between the target pixel from the first image and the given row of the second image based on an interpolation of the correlation scores. If a neighboring pixel of the candidate matching pixel is better correlated to the target pixel than the candidate matching pixel, the functions also include determining a correlation score between the target pixel and a second neighboring pixel of the neighboring pixel that is opposite the candidate matching pixel based on the similarity measure, and determining the disparity value between the target pixel from the first image and the given row of the second image based on an interpolation of the second correlation scores for the neighboring pixel, the second neighboring pixel, and the candidate matching pixel. The functions further include providing the disparity value between the target pixel from the first image and the given row of the second image.

In a further example, a system is disclosed that includes means for receiving a first image from a first imager and a second image from a second imager. The system further includes means for providing the first image and the second image to stereo matching hardware. The system additionally includes means for receiving from the stereo matching hardware a candidate matching pixel to a target pixel of the first image from a given row of the second image. The system further includes means for determining correlation scores between the target pixel and each of the candidate matching pixel, a left neighboring pixel of the candidate matching pixel, and a right neighboring pixel of the candidate matching pixel based on a similarity measure. The system also includes means for determining whether the candidate matching pixel is better correlated to the target pixel than each of the left neighboring pixel of the candidate matching pixel and the right neighboring pixel of the candidate matching pixel based on the correlation scores. If the candidate matching pixel is better correlated to the target pixel than each of the left neighboring pixel of the candidate matching pixel and the right neighboring pixel of the candidate matching pixel, the system additionally includes means for determining a disparity value between the target pixel from the first image and the given row of the second image based on an interpolation of the correlation scores. If a neighboring pixel of the candidate matching pixel is better correlated to the target pixel than the candidate matching pixel, the system also includes means for determining a correlation score between the target pixel and a second neighboring pixel of the neighboring pixel that is opposite the candidate matching pixel based on the similarity measure, and means for determining the disparity value between the target pixel from the first image and the given row of the second image based on an interpolation of the second correlation scores for the neighboring pixel, the second neighboring pixel, and the candidate matching pixel. The system further includes means for providing the disparity value between the target pixel from the first image and the given row of the second image.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 3A-3B illustrate an example of sub-pixel interpolation based on a second similarity measure, according to an example implementation.

DETAILED DESCRIPTION

Figure 1:
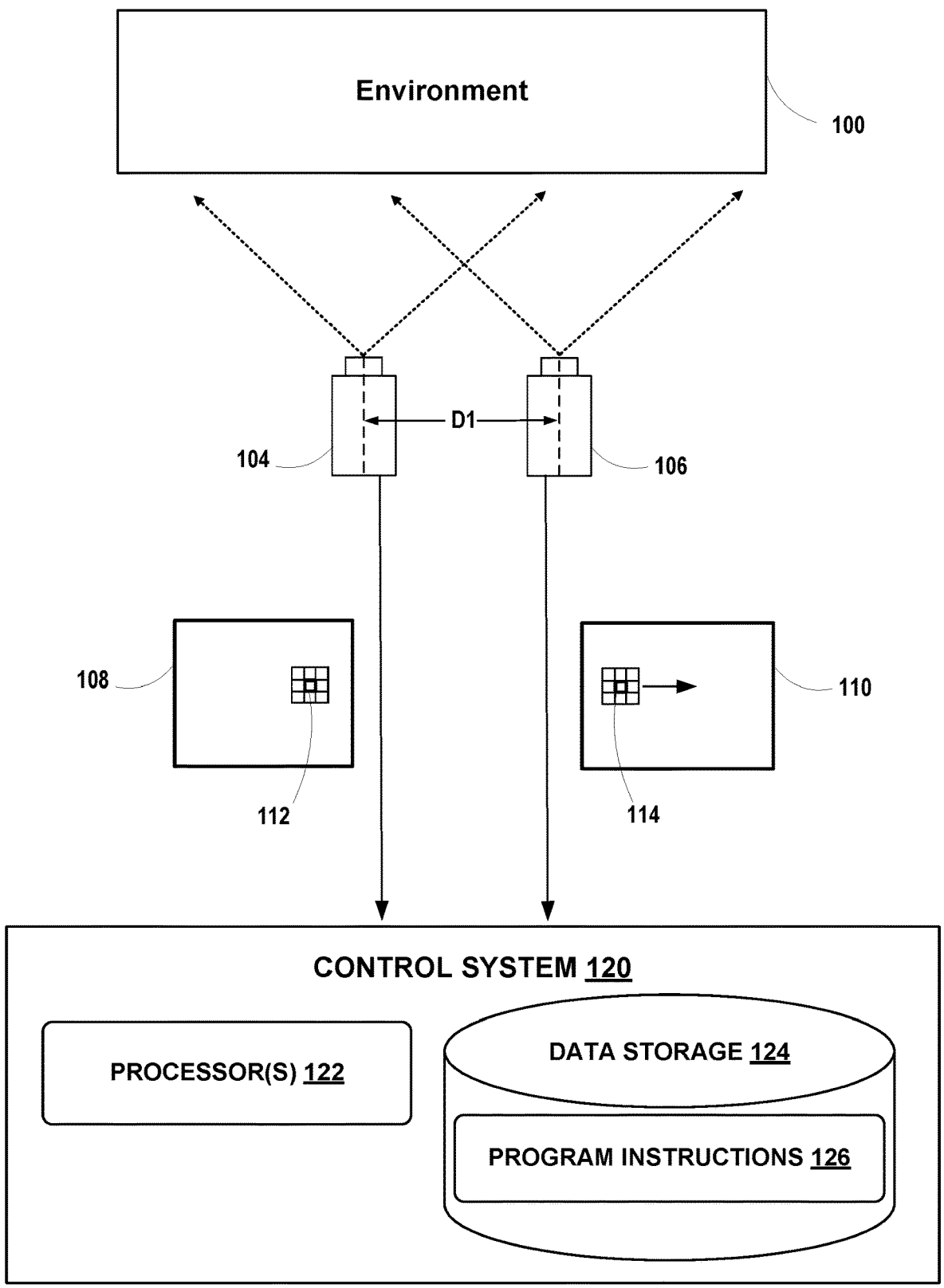
FIG. 1 illustrates a configuration of a system, according to an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Some computer vision-based depth sensing techniques involve capturing one or more images of an environment, identifying features in the image or images, and using triangulation or other techniques to determine the distance of those features from a reference point. In stereoscopic implementations, a pair of cameras captures images from two different perspectives. Based on a known spatial relationship of the cameras and the positions of corresponding features in the two images, a computing device can estimate the distance to the feature or a surface in the environment. More specifically, stereoscopic imaging typically involves matching a particular pixel in one image to a corresponding pixel in another image (where each image is taken from a slightly different vantage point). Based on a known distance between the cameras used to capture the two images and the disparity between the respective locations of those corresponding pixels, the depth of the surface imaged by that pixel can be determined.

Determining whether a pixel from a first image corresponds to a pixel from a second image is not necessarily a binary classification. Rather, an algorithm may be performed to determine a correlation score, which indicates the extent to which a particular pixel in the second image matches a particular pixel in the first image. One technique, referred to as stereo block matching, can be used to generate such correlation scores by considering values of pixels within a neighborhood that surrounds the particular pixels within each image.

In some implementations, the imagers used to capture the first image and the second image are positioned side-by-side (i.e., at the same height), such that corresponding pixels in the first image are expected to be within the same row in the second image. Thus, correlation scores (also referred to as "match values") can be calculated for a set of pixels in one row of the second image with respect to a particular pixel in the same row of the first image. Different similarity measures may be used to calculate the correlation scores for stereo block matching. The values sampled for each pixel may represent pixel intensity, R/G/B values, or a different type of value. Additionally, different size blocks may be used to sample different numbers of pixels surrounding a target pixel. Further, the manner in which values from pixel blocks are used to produce a correlation score may involve determining a census feature (see R. Zabih, J. Woodfill, *Nonparametric Local Transforms for Computing Visual Correspondence*, Lecture Notes in Computer Science, Vol. 801, pp. 151-158, Computer Vision-ECCV '94 (1994)), a sum of absolute differences, a sum of squared differences, or a different method.

The result of this process (calculating a set of match values for a set of pixels in a second image with respect to a particular pixel in the first image) can be thought of as a plot, where the Y-axis represents the match value and the X axis represents the pixel location in the second image. An example plot may appear to have a local minimum (if a lower score corresponds to a closer match) or a local maximum (if a higher score corresponds to a closer match), indicating the closest matching pixel in the second image with respect to the particular pixel in the first image. As a scatter plot, the minimum or maximum match value indicates the closest matching pixel.

For increased precision, lines or curves may be fitted to the scatter plot using interpolation. A local minimum or maximum may be identified that lies at some point between two pixels in the second image. In the context of stereoscopic depth sensing, such interpolation means may be used to produce more accurate, sub-pixel depth determination. In particular, rather than determining that pixel X in image A corresponds to pixel Y in image B and triangulating to determine depth, it may be determined that pixel X in image A corresponds to some point between pixels Y and Z in image B and triangulating based on the sub-pixel location. In this manner, depth sensing resolution can be increased.

As an example, to perform sub-pixel interpolation, let the best-match pixel in the right image have correlation score pc. Then, to perform sub-pixel interpolation, one method is to use the correlation scores of the neighboring pixel to the left (pl) and to the right (pr) of the best-match pixel. Using these three correlation scores, interpolation can be done using quadratic interpolation, V (linear) interpolation, or a different type of interpolation.

Within examples, different similarity measures may be used for stereo block matching and for sub-pixel interpolation to improve the efficiency of an image-processing pipeline without loss of accuracy in generating disparity values or a depth map. For efficiency, stereo block matching may use a reduced input feature when performing correlation operations to find the best match between right and left images for each pixel. For example, when using the census input feature, a stereo algorithm may use a reduced 8-bit census feature over a 5×5 window, rather than a higher-quality 48-bit feature over a 7×7 window. The smaller size of the census feature may allow for a more efficient (in space and time) block-matching pipeline. The efficiency gains may be particularly beneficial when the stereo block matching process is implemented using field-programmable gate array (FPGA) or application-specific integrated circuit (ASIC) hardware.

When reduced-size input features are used for the stereo block matching process, some gain in quality of the interpolation can be made by computing correlation scores with a second similarity measure (e.g., a non-reduced feature). In particular, instead of using correlation scores pc, pl, and pr, a system may instead substitute correlation scores pc', pl', and pr', where these correlation scores are computed for the same pixels in the second image using a full feature (e.g., a 48-bit census feature in the example above).

This technique works to give better quality for the output interpolated disparity (e.g., closer to ground truth). However, in some cases, the values of pc', pl', and pr' may not yield a correct interpolation, particularly when the interpolation is located at or near the midpoint of two integer disparities. This happens when one of pl'>=pc' or pr'>=pc' does not hold. That is, pc' is not the minimal value when the correlation scores are computed using the second similarity measure. In some examples, the best-match pixel based on the first similarity measure may first be confirmed to still be the best-match pixel based on correlation scores from the second similarity measure before the interpolation is performed. In particular, if both pl'>=pc' and pr'>=pc', then the interpolation may be performed using pc', pl', and pr' to produce a disparity value.

In the case where one of pl'>=pc' or pr'>=pc' does not hold, one of the second neighboring pixels of the initial candidate matching pixel may be used for the interpolation. In particular, let the correlation values of the two pixels on each side of the three interpolation pixels be pl2' and pr2' based on the second similarity measure. If pl2'>=pl' and pc'>=pl', then pl' may be used as the new center pixel and the interpolation may be performed based on pl2', pl', pc'. Similarly, if pr2'>=pr' and pc'>=pr', then pr' may be used as the new center pixel and the interpolation may be performed based on pc', pr', pr2'.

In any of the implementations disclosed herein, a depth-sensing system may include a processor or computing device configured to analyze image data and generate depth maps. Such a processor or computing device may include memory on which program instructions are stored, which upon execution carries out a depth map generating process. Such instructions may include known constants or configurations of the depth-sensing system (e.g., for a stereo imaging system, the relative positions of each image sensor). It should be understood that various depth map generation techniques may be used in combination with the disparity interpolation techniques disclosed herein, without departing from the scope of the present application.

FIG. 1 illustrates an example configuration of a system that may be used in connection with the implementations described herein. The system may include imagers 104 and 106 which are sensors configured to collect digital images of an environment 100. For example, each imager 104 and 106 could be a charge-coupled device (CCD) camera. In some examples, the imagers 104 and 106 may be part of an electromechanical system such as, for example, a robotic device or a vehicle, among a number of other possible implementations.

As described herein, an "environment" may refer to a portion of an environment that is within the field-of-view of one or more image sensors. As such, environment 100 may include additional objects or surfaces beyond a particular field-of-view. In some implementations, the imagers 104 and 106 may be movable (e.g., coupled to a robotic device) such that the field-of-view of the imagers changes. To simplify the description and explanation of implementations of the present application, the term "environment" may refer to a portion of an environment or scene that is within the field-of-view of imagers 104 and 106 at a particular point in time. In particular, image 108 may be an image of environment 100 captured by imager 104 at a same point in time that image 110 is captured by imager 106. However, it should be understood that the viewable portion of the environment 100 may change during the course of operation of an imaging system or depth-sensing system.

In some examples, a photometric stereo depth-sensing system may include two imagers 104 and 106, spaced apart at a fixed distance D1 such that each image sensor observes the environment from different perspectives. Depth or distance to surfaces within environment 100 may be determined via triangulation based on the distance D1 between the two image sensors and representations of corresponding features between image data captured by the two imagers 104 and 106. Furthermore, in some examples, the imagers 104 and 106 may be dedicated to detecting light within a particular wavelength band, which may be a visible band of light (e.g., red, green, and blue light) or an invisible band of light (e.g., infrared light).

Images 108 and 110 representing environment 100 that were captured by imagers 104 and 106 may be provided to a control system 120. In some examples, control system 120 may be located on the same device as imagers 104 and 106. For instance, imager 104, imager 106, and control system 120 may all be part of a robotic device. In other examples, control system 120 may be remote from imagers 104 and 106.

The control system 120 is shown to include processor(s) 122, data storage 124, and program instructions 126. Control system 120 is shown for illustration purposes only, and may include additional components and/or have one or more components removed without departing from the scope of the invention. For example, control system 120 may additionally include or be connected to additional controllers, projectors, sensors, power sources, actuators, and movable components. Further, the various components of the system may be connected in any manner.

Processor(s) 122 may be a general-purpose processor or a special purpose processor (e.g., digital signal processors, application specific integrated circuits, etc.). The processor(s) 122 can be configured to execute computer-readable program instructions 126 that are stored in the data storage 124 and are executable to provide the functionality of the control system 120 described herein. For instance, the program instructions 126 may be executable to receive and process images 108 and 110 from imagers 104 and 106 for depth sensing in environment 100.

The data storage 124 may include or take the form of one or more computer-readable storage media that can be read or accessed by processor(s) 122. The one or more computer-readable storage media can include volatile and/or non-volatile storage components, such as optical, magnetic, organic or other memory or disc storage, which can be integrated in whole or in part with processor(s) 122. In some embodiments, the data storage 124 can be implemented using a single physical device (e.g., one optical, magnetic, organic or other memory or disc storage unit), while in other embodiments, the data storage 124 can be implemented using two or more physical devices. Further, in addition to the computer-readable program instructions 126, the data storage 124 may include additional data such as diagnostic data, among other possibilities.

In some examples, the environment 100 may be partially illuminated by one or more light projectors to facilitate detection by imagers 104 and 106. An imaging or depth-sensing system may capture images of patterned light projected onto objects and/or surfaces within an environment. For instance, the texture projector may include a light source, projection optics, and a liquid crystal display (LCD) or other method of interrupting light with a pattern. The projected pattern may be a known combination of grids, dots, stripes, spots, horizontal bars, and/or vertical bars, among other shapes. A projector could project visible light or invisible light such as infrared projected patterns.

An example system, such as a robotic device, may include one or more additional sensors such as force sensors, proximity sensors, motion sensors, load sensors, position sensors, touch sensors, depth sensors, ultrasonic range sensors, and infrared sensors, among other possibilities. The sensor(s) may provide sensor data to the processor(s) 122 to allow for appropriate interaction of the system with the environment. Further, the system may also include one or more power source(s) configured to supply power to various components of the system. Any type of power source may be used such as, for example, a gasoline engine or a battery.

The system may also include one or more actuator(s). An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in a robotic device). In other cases, an actuator may be a linear actuator that may be used in systems involving straight line motion.

In either case, actuator(s) may cause movement of various movable component(s) of the system. The moveable component(s) may include appendages such as robotic arms, legs, and/or hands, among others. The moveable component(s) may also include a movable base, wheels, and/or end effectors, among others.

In some implementations, a computing system (not shown) may be coupled to the control system 120 and may be configured to receive input from a user, such as via a graphical user interface. This computing system may be incorporated within the control system 120 or may be an external computing system that is capable of (wired or wireless) communication with the control system 120. As such, the control system 120 may receive information and instructions, such as based on user-input at the graphical user interface and/or based on user-input received via press of buttons (or tactile input) on the control system 120, among other possibilities.

A system may take on various forms, such as a robotic device with some combination of actuators, controllers, sensors, end effectors, and/or other robotic components. In some instances, the system may include a combination of elements-such as imager 104, imager 106, and control system 120—that collectively form a depth-sensing subsystem. Such a depth-sensing subsystem may be similar to implementations disclosed herein, and may be incorporated within a robotic system or the like in order to carry out depth sensing as a part of the robotic system's operation.

In some examples, a robotic system or a different type of system may use computer vision techniques to determine a representation of three-dimensional (3D) scene geometry. By way of example, a robotic system may triangulate information observed from a scene to determine a depth to one or more surfaces in a scene. For stereo image processing, two optical sensors with a known physical relationship to one another are used to capture two images of a scene. By finding mappings of corresponding pixel values within the two images and calculating disparity values indicating how far apart these common areas reside in pixel space, a computing device can determine a depth map or image using triangulation. The depth map or depth image may contain information relating to the distances of surfaces of objects in the scene.

Imagers 104 and 106 may be aligned at a same height so that corresponding pixels from images 108 and 110 may be located within the same row. Control system 120 may then perform a stereo block matching process, as described in more detailed in the following description, to locate corresponding pixels between image 108 and image 110. For example, to locate a corresponding pixel for target pixel 112 in image 108, a block of pixel values from a neighborhood of pixels surrounding target pixel 112 may be determined. The block of pixel values may be compared to blocks of pixel values from neighborhoods of pixels surrounding individual pixels in image 110, such as pixel 114, while moving the window along the corresponding scanline to identify a best matching pixel for target pixel 112. In further examples, imagers 104 and 106 may not be vertically aligned, in which case one or more image rectification processes may first be executed to vertically align images 108 and 110 to determine which row of image 110 to search for a matching pixel to target pixel 112.

Figure 2:
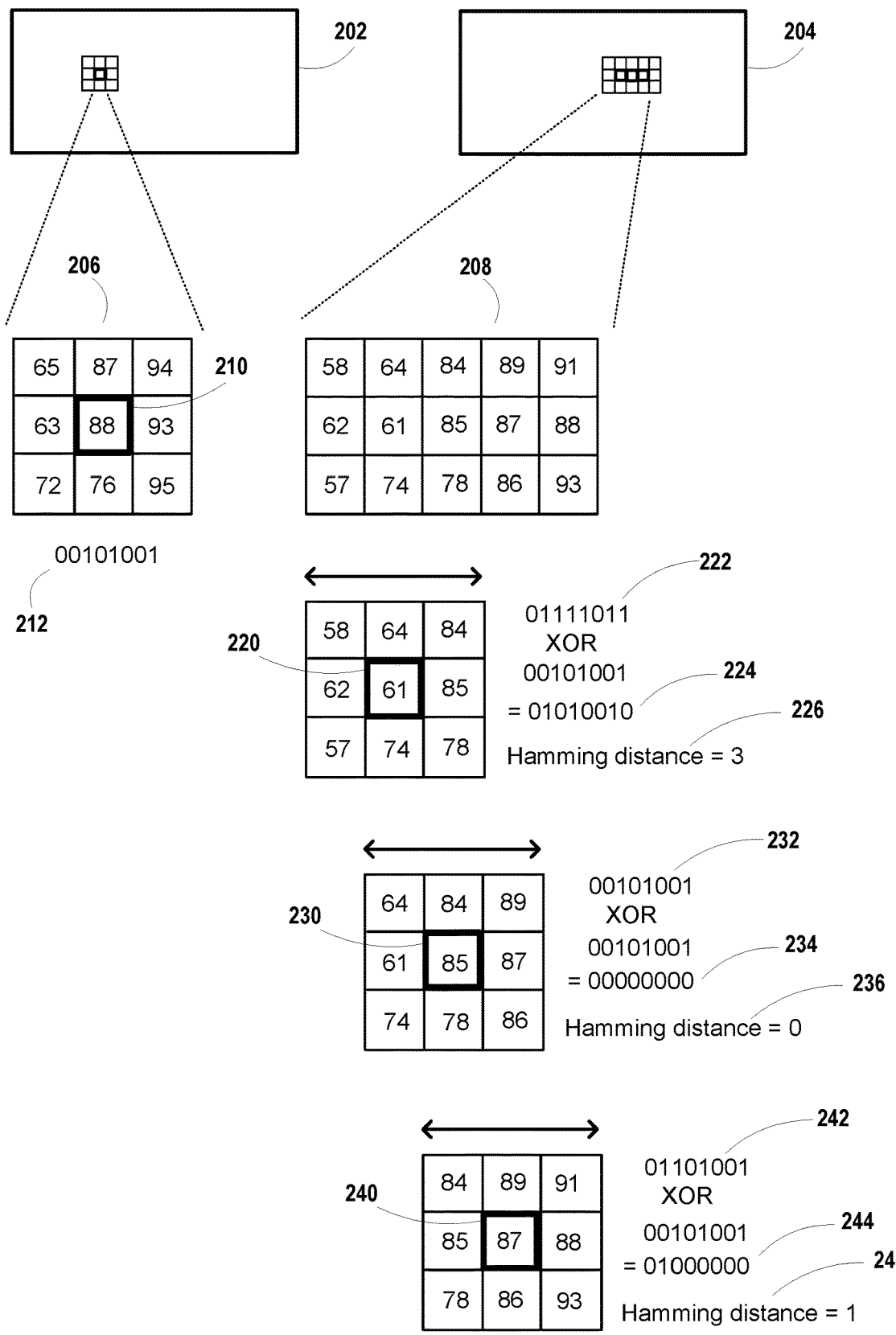
FIG. 2 illustrates an example of stereo block matching based on a first similarity measure, according to an example implementation.

FIG. 2 illustrates an example of stereo block matching based on a first similarity measure, according to an example implementation. More specifically, blocks of pixel values within a first image 202 and a second image 204 may be considered. A pixel refers to a particular location within an image. Pixel values for each pixel may be received from the imager and used in the block matching process. The pixel value may be an intensity value, such as an 8-bit grayscale intensity value between 0 and 255. In other examples, the pixel value may be an intensity value for a particular color, such as red, green, or blue.

A similarity measure indicates a particular function for determining an amount of similarity between respective pixels from a first image and a second image. More specifically, a similarity measure may include a block size for sampling pixel values in a neighborhood surrounding a pixel in each image as well as a process for using the pixel values from the blocks to produce a correlation score. FIG. 2 illustrates a first similarity measure based on a 3×3 block size using a census input feature with intensity values for the pixel values. In other examples, different similarity measures may involve different block sizes, different pixel values, and/or a different process for computing correlations scores using the blocks of pixel values.

In reference to FIG. 2, a 3×3 block 206 of intensity values for pixels surrounding a target pixel 210 from the first image 202 is determined (e.g., received from an imager). A census transform is applied to the block 206 to produce an 8-bit binary string 212 indicating whether each neighboring pixel has a value greater than target pixel 210 (ordered by row and then by column).

A group 208 of pixel values from the second image 204 are determined (e.g., received from an imager) to locate a best-match pixel for target pixel 210 from image 204. In particular, the group 208 includes pixel values for pixels surrounding pixels 220, 230, and 240. Each of pixel 220, 230, and 240 may be a pixel from the same row as target pixel 210 that is being considered as a possible best-match pixel.

For pixel 220, a 3×3 block of intensity values of neighboring pixels is transformed into an 8-bit binary string 222. An XOR function is applied to binary string 222 and the binary string 212 representing the neighborhood of target pixel 210 to produce binary string 224. A Hamming distance 226 of the binary string 224 may be determined indicating the number of positions in which string 212 and string 222 differ (in this case, 3 positions). The Hamming distance may be a correlation score where a lower value indicates a better match, with a score of 0 indicating a best possible match.

The same process may be repeated to determine correlation scores for pixels 230 and 240. For pixel 230, a 3×3 block of intensity values of neighboring pixels is transformed into an 8-bit binary string 232. An XOR function is applied to binary string 232 and binary string 212 to produce binary string 234, yielding a Hamming distance 236 or correlation score of 0. For pixel 240, a 3×3 block of intensity values of neighboring pixels is transformed into an 8-bit binary string 242. An XOR function is applied to binary string 242 and binary string 212 to produce binary string 244, yielding a Hamming distance 246 or correlation score of 1.

Pixel 230 may be identified as the best-match pixel based on the 8-bit census feature. If limited to integer disparities, the location of pixel 230 in the second image may be used to compute a disparity for target pixel 210 in the first image. However, sub-pixel interpolation may be used to produce a more accurate disparity value. Rather than using the 8-bit census feature, a more nuanced feature may be used as the similarity measure to improve the accuracy of the sub-pixel interpolation. In this case, pixel 230 may be identified as a candidate matching pixel for target pixel 210 based on the first similarity measure before computing more precise correlation scores for each of pixel 220, 230, and 240.

In reference now to FIG. 3A, a 5×5 block 302 of pixel values surrounding target pixel 210 in the first image may be used to compute a more precise census feature than using only a 3×3 block. The 5×5 block 302 may be transformed into a 24-bit binary string 312. A group 304 of pixel values surrounding pixels 220, 230, and 240 in the second image may be determined as shown in order to compute correlation scores based on a second similarity measure that employs the larger 5×5 window.

For pixel 220, the surrounding 5×5 block may be transformed into a 24-bit binary string 322. An XOR function is applied to binary string 322 and binary string 312 to produce binary string 324, yielding a Hamming distance 326 or correlation score of 6. For pixel 230, the surrounding 5×5 block may be transformed into a 24-bit binary string 332. An XOR function is applied to binary string 332 and binary string 312 to produce binary string 334, yielding a Hamming distance 336 or correlation score of 2. For pixel 240, the surrounding 5×5 block may be transformed into a 24-bit binary string 342. An XOR function is applied to binary string 342 and binary string 312 to produce binary string 344, yielding a Hamming distance 346 or correlation score of 4.

In this case, pixel 230 is confirmed to still be the best-match pixel when using the second similarity measure (the 24-bit census feature using a 5×5 block) because pixel 230 has a lower match value (correlation score of 2) than either the left neighboring pixel 220 (correlation score of 6) or the right neighboring pixel 240 (correlation score of 4). After pixel 230 is confirmed to be the best-match pixel based on the second set of correlation scores, sub-pixel interpolation may be performed on the correlation scores for pixels 220, 230, and 240. The interpolation may be expected to produce greater accuracy than performing the interpolation on the correlation scores resulting from the initial similarity measure (using the 3×3 block).

Figure 3B:
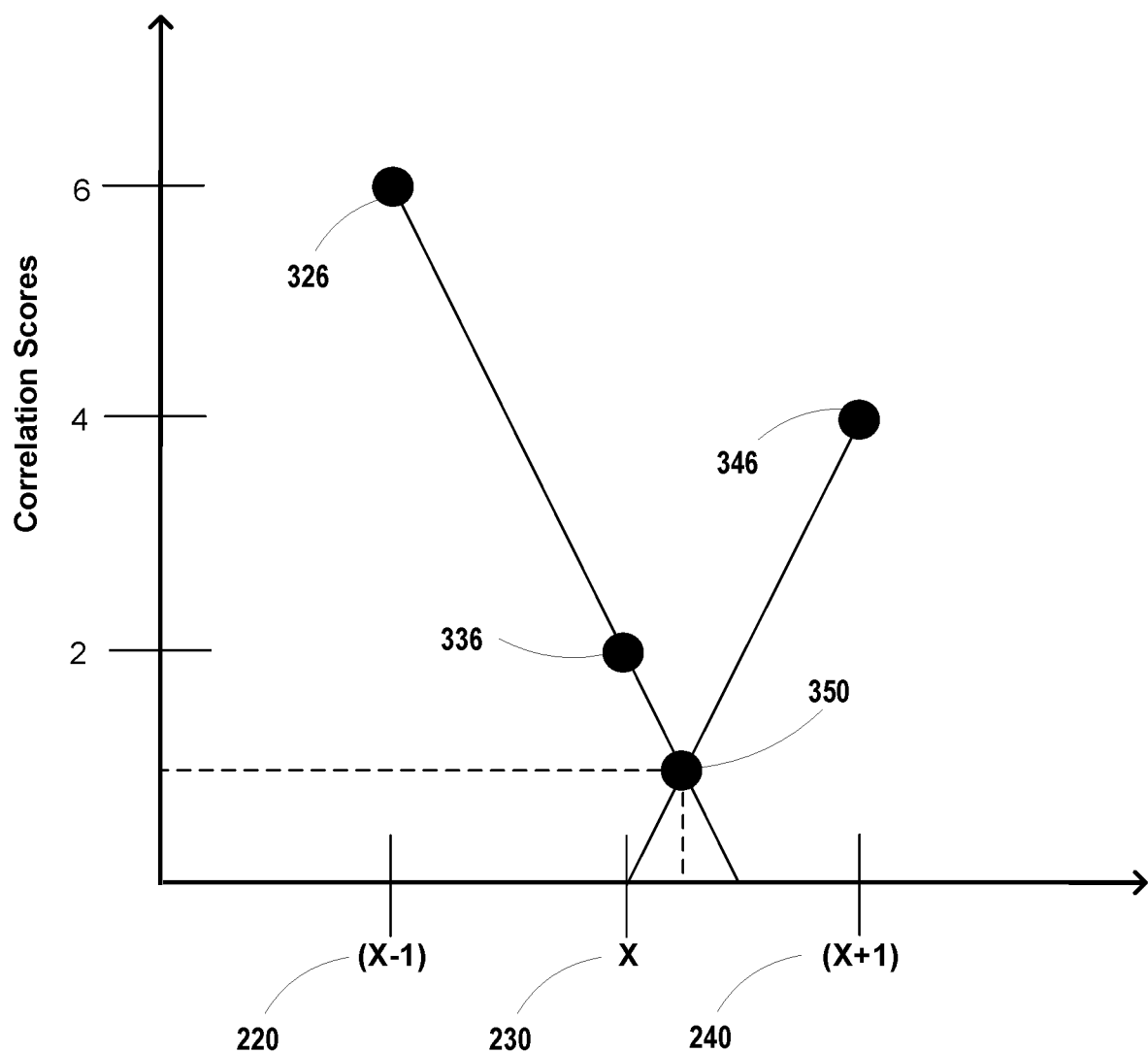

In reference to FIG. 3B, an example sub-pixel interpolation to determine a disparity value is illustrated. The Y-axis represents correlation scores between respective pixels from the second image and the target pixel from the first image. The X-axis represents locations of the pixels in the second image. More specifically, pixel 230 is used as the center pixel for the interpolation. The interpolation is performed on correlation score 326 of pixel 220, correlation score 336 of pixel 230, and correlation score 346 of pixel 240. In this case, a linear V-interpolation of the three correlation scores (also referred to as equiangular line fitting) is performed to determine a minimum point 350 for estimating the sub-pixel position as the intersection point of two lines. The interpolated X-value of the point 350 represents a location between pixels 230 and 240 that may be used to compute a disparity from the target pixel in the first image.

To perform a linear V-interpolation, a first line is passed through (X−1, 6) and (X, 2). A second line passes through (X+1, 4) with the inverse-sign gradient. The sub-pixel disparity may then be estimated as ½ (4−6)/(2−6)=0.25. The overall disparity may then be computed based on a location of X+0.25 in the second image, where X is the location of pixel 230. In another example, a quadratic function may be fitted to correlation scores 326, 336, and 346. A minimum value of the quadratic function may then be computed to determine the disparity value.

Figure 4A:
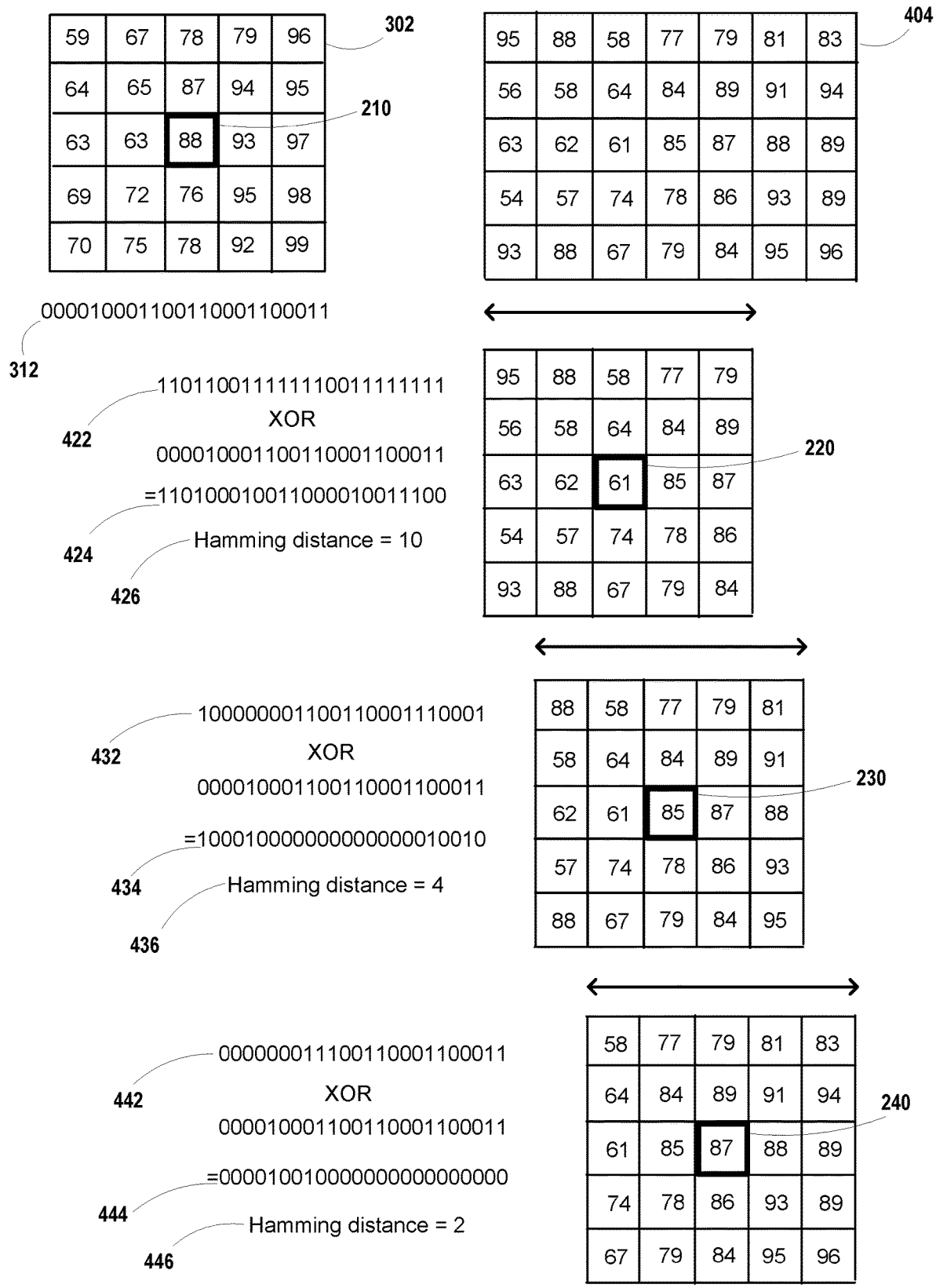
FIGS. 4A-4D illustrate another example of sub-pixel interpolation based on a second similarity measure, according to an example implementation.

Referring now to FIG. 4A, a scenario is illustrated in which the pixel block 302 surrounding target pixel 210 in the first image is the same as in FIG. 3A, but some of the pixel values in the group 404 of pixels surrounding pixels 220, 230, and 240 in the second image are different. A 24-bit census feature is again computed between target pixel 210 and each of pixels 220, 230, and 240.

For pixel 220, the surrounding 5×5 block may be transformed into a 24-bit binary string 422. An XOR function is applied to binary string 422 and binary string 312 to produce binary string 424, yielding a Hamming distance 426 or correlation score of 10. For pixel 230, the surrounding 5×5 block may be transformed into a 24-bit binary string 432. An XOR function is applied to binary string 432 and binary string 312 to produce binary string 434, yielding a Hamming distance 436 or correlation score of 4. For pixel 240, the surrounding 5×5 block may be transformed into a 24-bit binary string 442. An XOR function is applied to binary string 442 and binary string 312 to produce binary string 444, yielding a Hamming distance 446 or correlation score of 2.

Figure 4B:
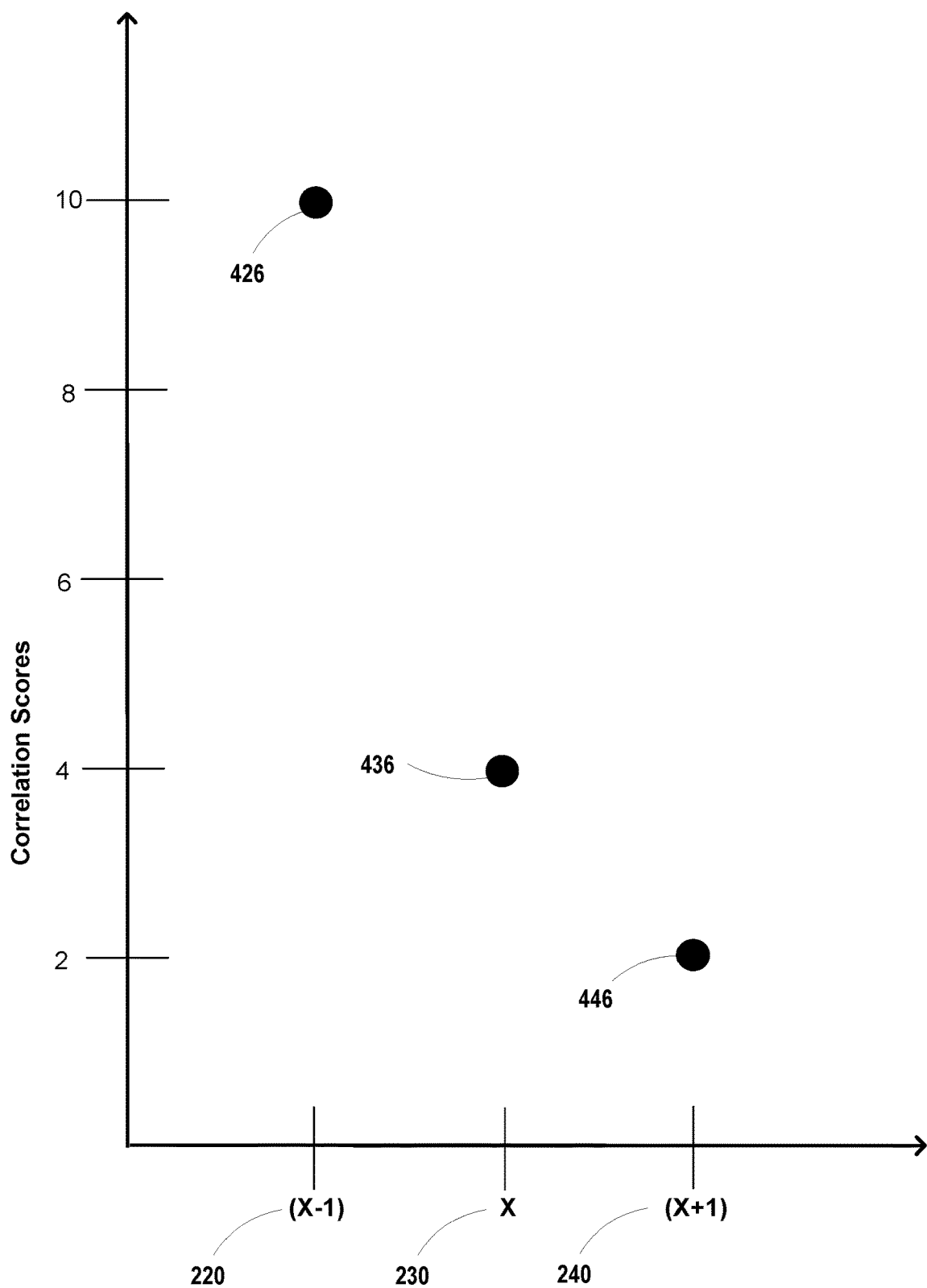

In this case, pixel 230 is not the best-match pixel when using the second similarity measure (the 24-bit census feature using a 5×5 block) because pixel 240 has a lower match value (correlation score of 2) than pixel 230 (correlation score of 4). FIG. 4B illustrates a plot of correlation scores 426, 436, and 446. As shown, correlation score 436 is not the best match. Accordingly, using pixel 230 as the center pixel for the interpolation will not produce an accurate disparity result. Rather than computing an interpolation of correlation scores 426, 436, and 446, the right neighboring pixel of pixel 240 (the second right neighbor of pixel 230) may instead be examined.

Figure 4C:
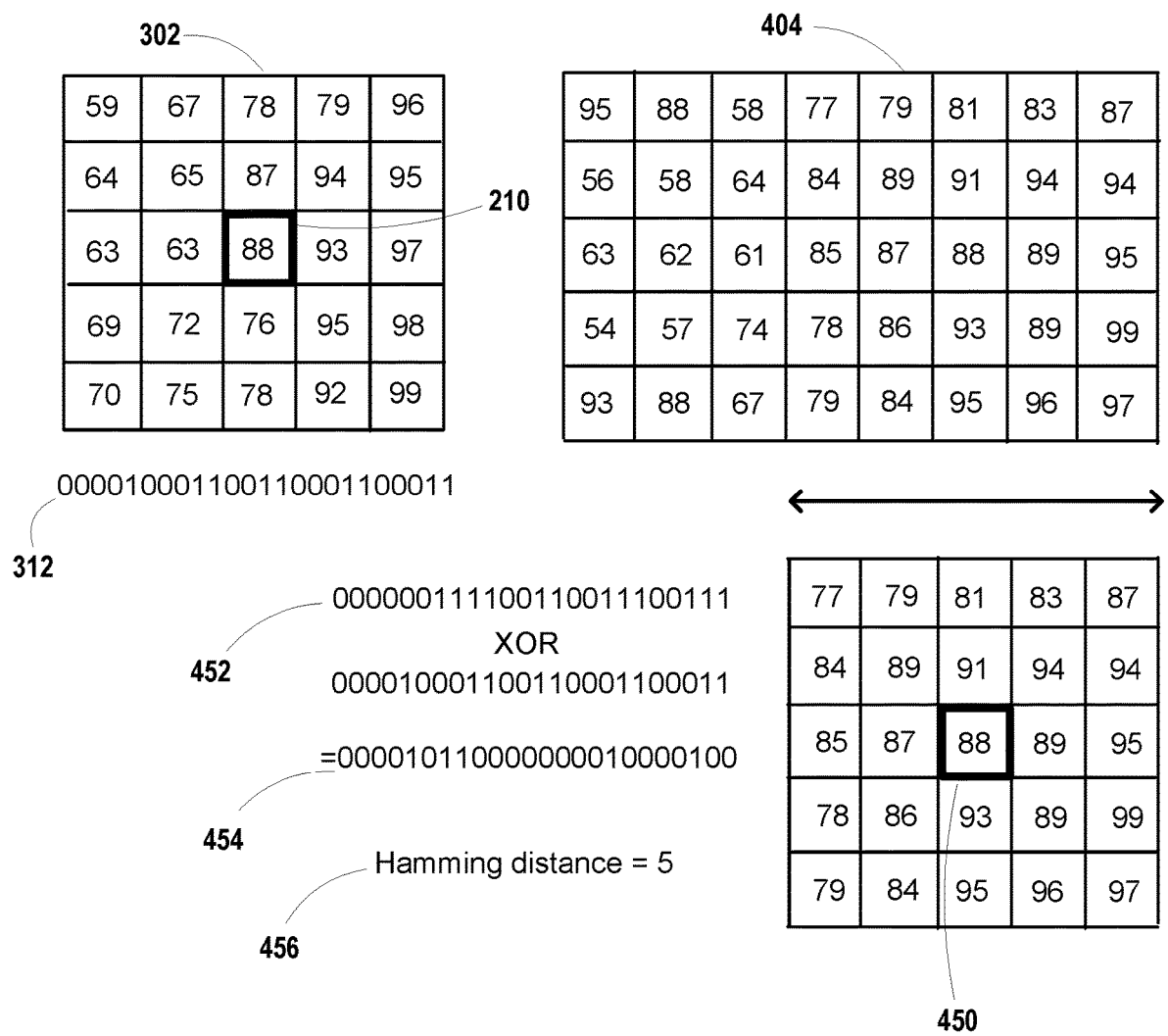

In reference to FIG. 4C, an additional correlation score for a second neighbor of the initial candidate matching pixel is illustrated. In particular, a correlation score between target pixel 210 and pixel 450 is computed using the 24-bit census feature. For pixel 450, the surrounding 5×5 block may be transformed into a 24-bit binary string 452. An XOR function is applied to binary string 452 and binary string 312 to produce binary string 454, yielding a Hamming distance 456 or correlation score of 5.

Figure 4D:
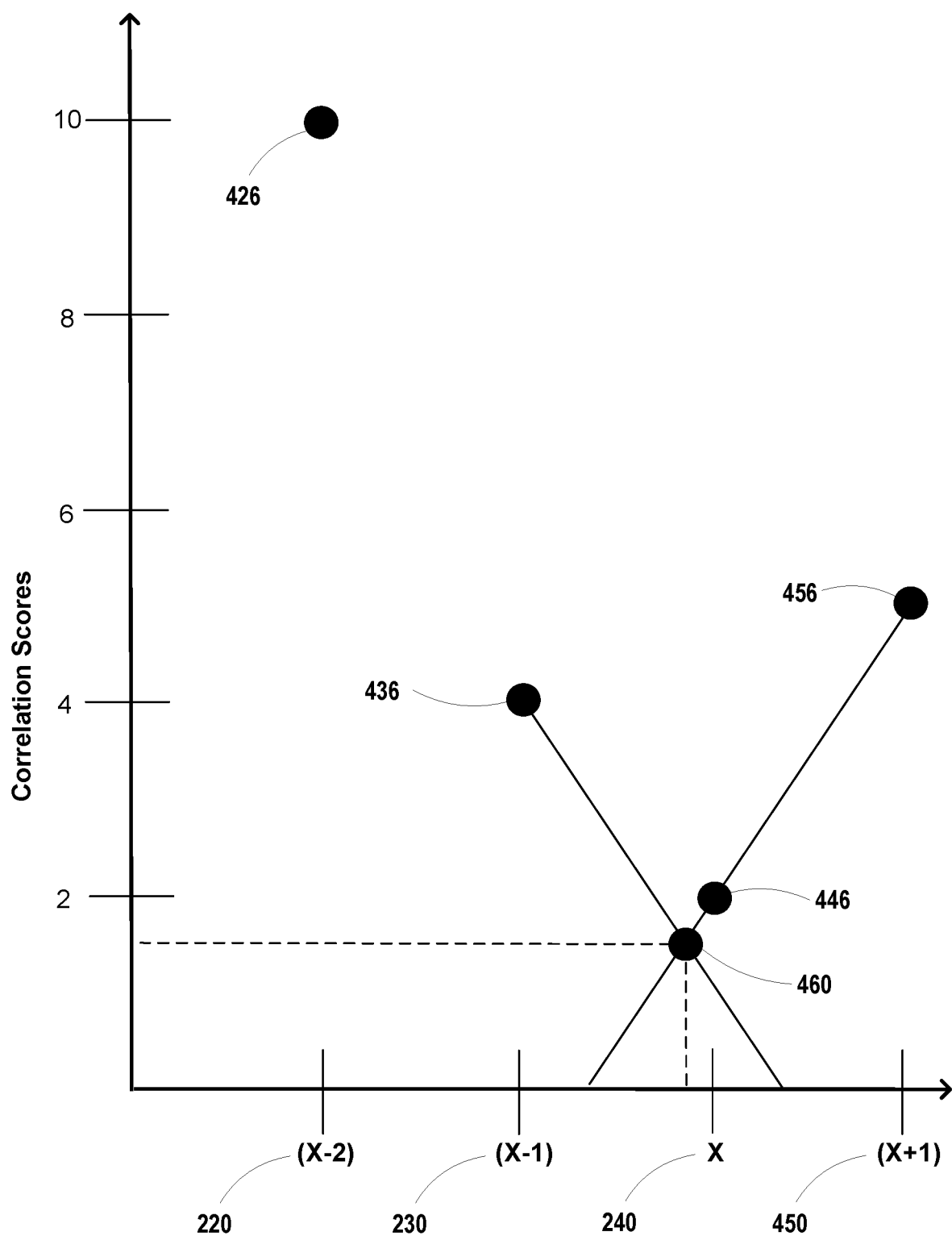

FIG. 4D illustrates the correlation scores for pixels 220, 230, 240, and 450. Because correlation score 446 of pixel 240 is less than correlation score 436 of pixel 230, pixel 230 is not used as the center pixel for the interpolation. Instead, pixel 240 is used as the center pixel and the interpolation is performed on correlation scores 436, 446, and 456 of pixels 230, 240, and 450.

In this example, a linear V-interpolation of the three correlation scores 436, 446, and 456 is performed to determine a minimum point 460 for estimating the sub-pixel position as the intersection point of two lines. The interpolated X-value of the point 460 represents a location between pixels 230 and 240 that may be used to compute a disparity from the target pixel in the first image. To perform the linear V-interpolation, a first line is passed through points (X+1, 5) and (X, 2). A second line passes through (X−1, 4) with the inverse-sign gradient. The sub-pixel disparity may then be estimated as ½ (5−4)/(2−5)=−⅙. The overall disparity may then be computed based on a location of X−⅙ in the second image, where X is the location of pixel 240.

In some examples, correlation score 456 may first be confirmed to be greater than or equal to correlation score 446 before performing the interpolation. If correlation score 456 were found to be less than correlation score 446, then pixel 240 also could not be used as the center pixel for the interpolation. In that case, an output signal may be provided indicating an erroneous disparity match.

Figure 5:
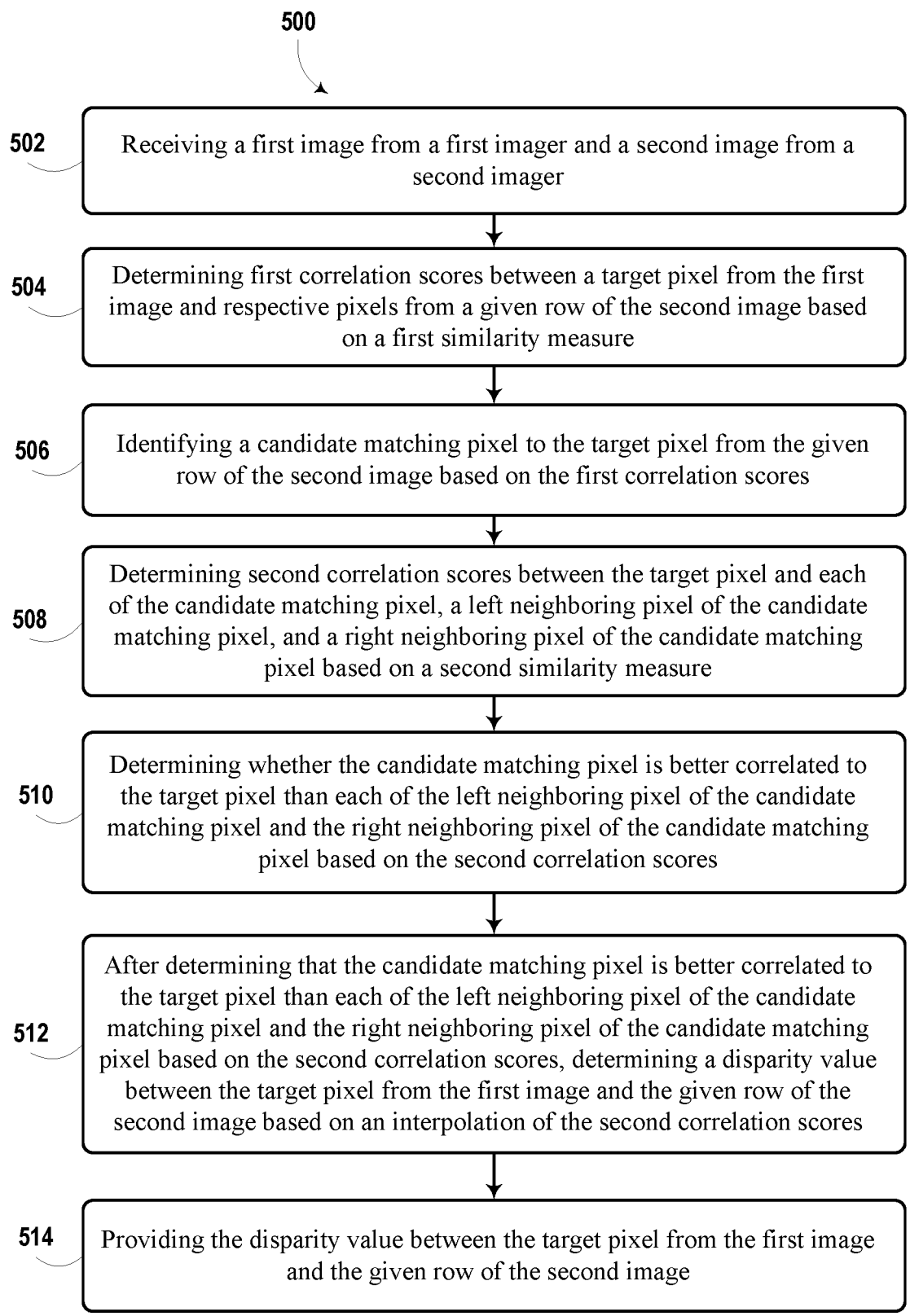
FIG. 5 is a flowchart illustrating a method, according to an example implementation.

FIG. 5 is a flowchart of operations 500 for providing a disparity value, according to an example implementation. Operations 500 shown in FIG. 5 present an implementation that could be used by computing devices or control systems. Operations 500 may include one or more actions as illustrated by blocks 502-514. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 500 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device. In addition, one or more blocks in FIG. 5 may represent circuitry that is wired to perform the specific logical operations.

Block 502 includes receiving a first image from a first imager and a second image from a second imager. Each imager may be a separate image sensor with its own lens. The imagers may be vertically aligned and offset by a known horizontal distance. The first image and the second image may be captured at the same time to show two different perspectives of an environment at the same time for depth sensing.

Block 504 includes determining first correlation scores between a target pixel from the first image and respective pixels from a given row of the second image. A correlation score represents an amount of similarity between a pixel from the first image and a pixel from the second image. The first correlation scores may each be determined based on a first similarity measure. The first similarity measure may indicate how to use pixel values from the neighborhood surrounding a pixel from each image to compute a correlation score. In some cases, first correlation scores may be determined for an entire row of the second image. In other examples, some prior depth information may be used to limit the search space.

Block 506 includes identifying a candidate matching pixel to the target pixel from the given row of the second image based on the first correlation scores. The candidate matching pixel may be the pixel from the second image that best matches the target pixel when similarity is estimated using the first similarity measure. Depending on the first similarity measure, the candidate matching pixel may be the pixel from the second image with the lowest correlation score or the highest correlation score.

Block 508 includes determining second correlation scores between the target pixel and each of the candidate matching pixel, a left neighboring pixel of the candidate matching pixel, and a right neighboring pixel of the candidate matching pixel. The neighboring pixels are pixels on either side of the candidate matching pixel within the given row of the second image. The second correlation scores may be computed based on a second similarity measure that is different than the first similarity measure. Accordingly, the second correlation scores for the same pixels may be different than the first correlation scores. In some examples, the second similarity measure may be more nuanced such that it is expected to produce more precise correlation scores. The second similarity measure may also be less efficient to determine than the first similarity measure in time and/or in space.

Block 510 includes determining whether the candidate matching pixel is better correlated to the target pixel than each of the left neighboring pixel of the candidate matching pixel and the right neighboring pixel of the candidate matching pixel based on the second correlation scores. In some cases, the candidate matching pixel may be verified to still be the best-match pixel based on the second similarity measure. For instance, it may be determined that candidate matching pixel has a lower second correlation score than either of its neighboring pixels.

Block 512 includes after determining that the candidate matching pixel is better correlated to the target pixel than each of the left neighboring pixel of the candidate matching pixel and the right neighboring pixel of the candidate matching pixel based on the second correlation scores, determining a disparity value between the target pixel from the first image and the given row of the second image. The disparity value indicates how far apart the portion of the environment represented by the target pixel appears between the two images. The disparity value may be estimated by computing an interpolation of the second correlation scores. In some cases, the second correlation scores may be more precise than the first correlation scores for the same pixels such that a sub-pixel interpolation of the second correlation scores produces a more precise disparity estimate than a sub-pixel interpolation of the first correlation scores.

Block 514 includes providing the disparity value between the target pixel from the first image and the given row of the second image. In some examples, the disparity value may be provided to a separate computing system. In other examples, the same computing system may determine the disparity value and then perform further processing using the disparity value. In further examples, a partial or full disparity map may be determined which represents amounts of disparity for each of a plurality of target pixels from the first image. In additional examples, a partial or full depth map of the environment may be determined using the disparity values and a known camera offset. Greater disparity values indicate shorter depth (e.g., less distance to an object). In further examples, distance estimates to particular surfaces or objects in the environment may be computed based on one or more interpolated disparity values.

Figure 6:
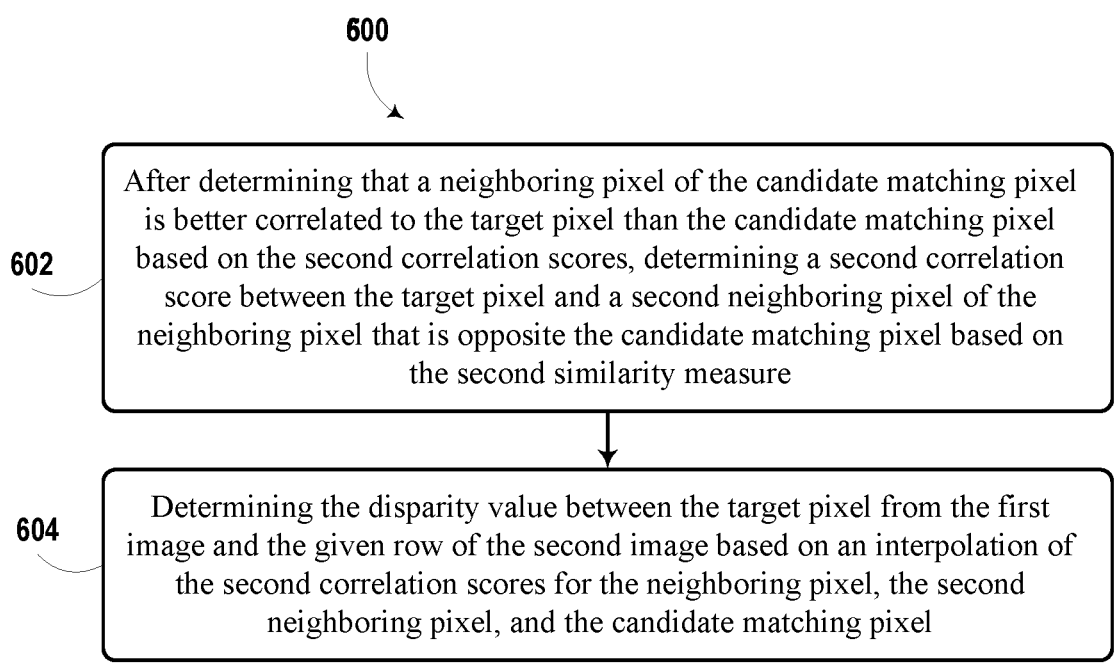
FIG. 6 is a flowchart illustrating additional method functions, according to an example implementation.

FIG. 6 is a flowchart illustrating additional operations that may be performed as part of the implementation illustrated in FIG. 5. Operations 600 may be performed by a computing device that is also configured to perform operations 500 illustrated by each of the blocks 502-514 from FIG. 5. Operations 600 may include one or more actions as illustrated by blocks 602-604.

Block 602 includes after determining that a neighboring pixel of the candidate matching pixel is better correlated to the target pixel than the candidate matching pixel based on the second correlation scores, determining a second correlation score between the target pixel and a second neighboring pixel of the neighboring pixel that is opposite the candidate matching pixel. In some cases, it may be determined that the candidate matching pixel is not the best-match pixel to the target pixel when the second similarity measure is applied. In that case, performing a sub-pixel interpolation with the candidate matching pixel as the center pixel may not produce an accurate result. Instead, the neighboring pixel that is a better match may be used as the center pixel. To perform the interpolation, a correlation score for the second neighboring pixel of the candidate matching pixel is computed using the second similarity measure.

Block 604 includes determining the disparity value between the target pixel from the first image and the given row of the second image based on an interpolation of the second correlation scores for the neighboring pixel, the second neighboring pixel, and the candidate matching pixel. The disparity value may be computed using a linear V-interpolation or a quadratic interpolation. In some cases, the neighboring pixel may first be confirmed to be a better match than the second neighboring pixel. If the second neighboring pixel is a better match, the neighboring pixel cannot be used as a center pixel for the interpolation either, and an output signal indicating an erroneous disparity match may be provided.

In some examples, the second similarity measure may be expected to provide greater accuracy than the first similarity measure while the first similarity measure may be more efficient to compute in time and/or space. The second similarity measure may involve sampling the images with a greater block size or window size than the first similarity measure. A number of different possible functions or transformations may be used to compute each similarity measure. In one example, each similarity measure involves computing a census input feature. In other examples, one or both similarity measure may involve computing a sum of absolute differences, a sum of squared differences, or a different type of input feature. In some examples, the first similarity measure and the second similarity measure may involve different types of functions. For instance, the first similarity measure may be a census feature and the second similarity measure may be a sum of squared differences.

In some examples, the first similarity measure may be a first census feature having a first feature size and the second similarity measure may be a second census feature having a second feature size that is greater than the first feature size. For instance, the first census feature may be a 24-bit feature based on a 5×5 window and the second census feature may be a 48-bit feature based on a 7×7 window. In another example, the first census feature may be a reduced census feature (e.g., an 8-bit feature over a 5×5 window) by only considering certain pixel values or combining multiple pixel values into individual binary values. In further examples, the block size may be the same for the first census feature and second census feature, but the first census feature may be reduced in size relative to the second census feature.

In some examples, sub-pixel interpolation may be performed using correlation scores for three pixels. In other examples, more than three pixels may be used. For instance, the center pixel may be determined as described above, but additional second left neighbor and second right neighbor pixels may also be used in the interpolation. Other quantities of pixels may be used in the interpolation step as well.

Figure 7:
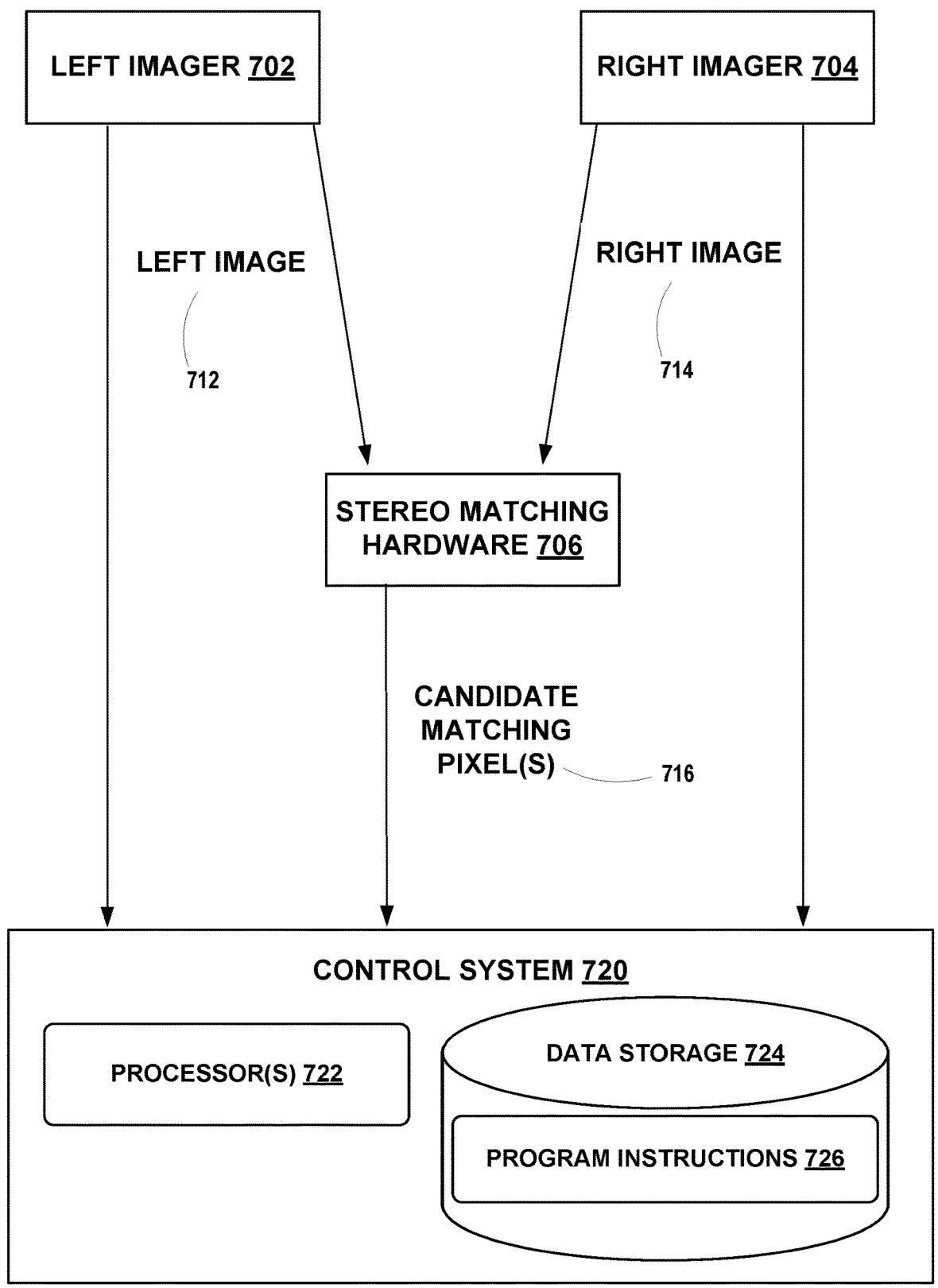
FIG. 7 illustrates a configuration of another system, according to an example implementation.

In reference to FIG. 7, another example system is illustrated. The system includes a left imager 702, a right imager 704, and a stereo matching hardware component 706. The stereo matching hardware 706 may contain a hardware implementation of stereo block matching using FPGA or ASIC hardware. A control system 720 may provide the stereo matching hardware 706 with left image 712 from left imager 702 and right image 714 from right imager 704. Stereo matching hardware 706 may then perform block-matching search operations to locate one or more candidate matching pixels 716. In particular, the candidate matching pixels 716 may be one or more pixel locations from the right image 714 that are best-match pixels for one or more pixels in left image 712 according to a similarity measure applied by stereo matching hardware 706.

Control system 720 may include processor(s) 722, data storage 724, and program instructions 726 that enable control system 720 to use the candidate matching pixel(s) 716 to determine one or more disparity values. In particular, control system 720 may be configured to compute separate correlation scores to perform a sub-pixel interpolation. In some examples, the correlation scores computed by control system 720 may be based on a similarity measure that is more precise, but less efficient than a similarity measure used by stereo matching hardware 706. By relying on stereo matching hardware 706 to perform the initial searching operations, control system 720 may only need to determine correlation scores for a few pixels using the more nuanced similarity measure in order to determine a disparity value using sub-pixel interpolation.

Figure 8:
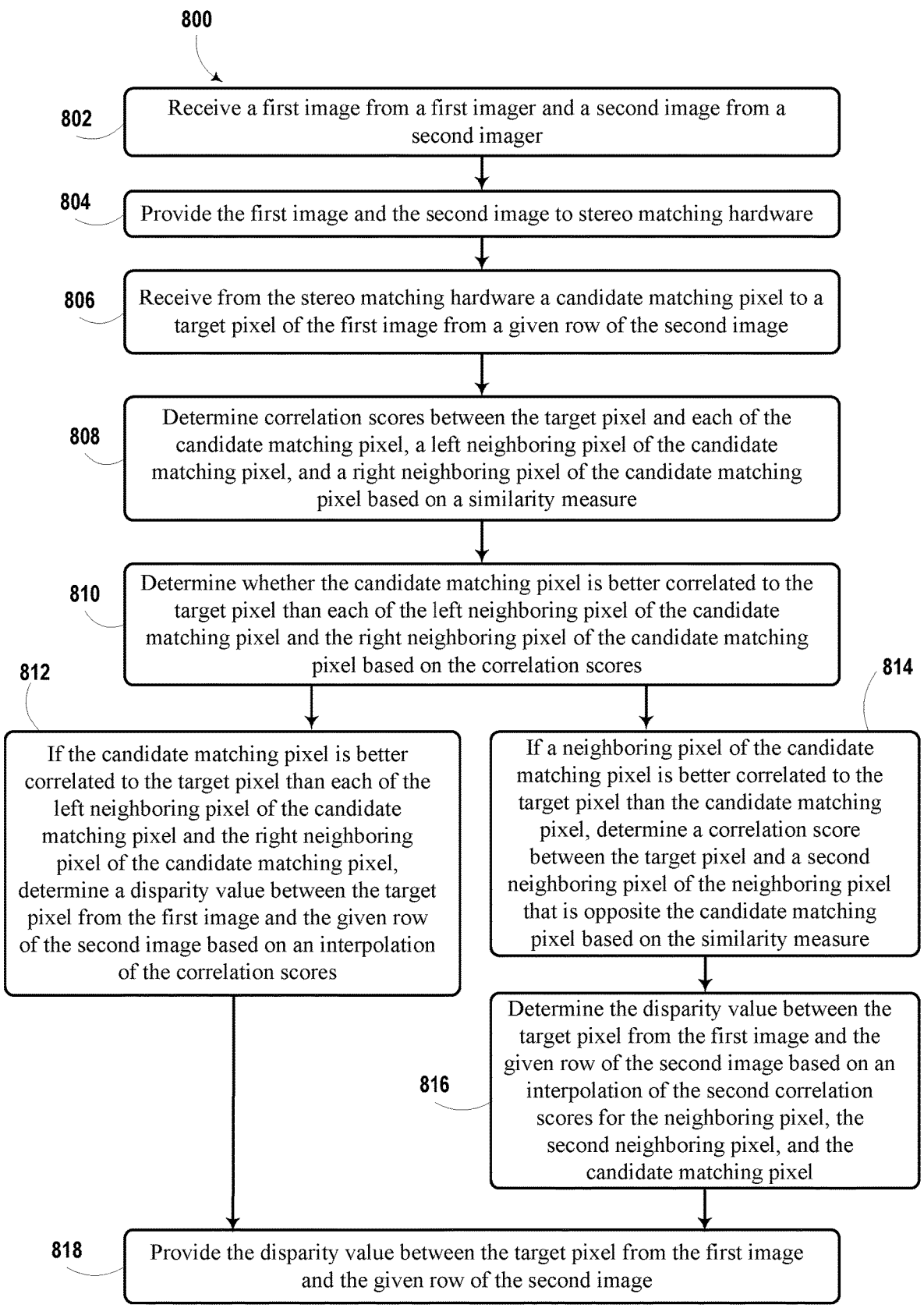
FIG. 8 is a flowchart illustrating another method, according to an example implementation.

FIG. 8 is a flowchart of operations 800 for providing a disparity value, according to an example implementation. Operations 800 shown in FIG. 8 present an implementation that could be used by computing devices or control systems, such as the system illustrated in FIG. 7. Operations 800 may include one or more actions as illustrated by blocks 802-816. These blocks may also be performed in parallel, and/or in a different order than those described herein. Also, the various blocks may be combined into fewer blocks, divided into additional blocks, and/or removed based upon the directed implementation.

In addition, the operations 800 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device. In addition, one or more blocks in FIG. 8 may represent circuitry that is wired to perform the specific logical operations.

Block 802 includes receiving a first image from a first imager and a second image from a second imager. The imagers may be vertically aligned and horizontally offset by a known distance.

Block 804 includes providing the first image and the second image to stereo matching hardware. The stereo matching hardware may be part of the same device as a control system performing the operations of block 804, or it may be remote.

Block 806 includes receiving from the stereo matching hardware a candidate matching pixel to a target pixel of the first image from a given row of the second image. In some cases, the candidate matching pixel may be the result of a stereo block matching process performed by the stereo matching hardware using a particular similarity metric, such as an 8-bit census feature over a 3×3 block size.

Block 808 includes determining correlation scores between the target pixel and each of the candidate matching pixel, a left neighboring pixel of the candidate matching pixel, and a right neighboring pixel of the candidate matching pixel based on a similarity measure. The similarity measure may be different than a similarity measure used by the stereo matching hardware. In some cases, the similarity measure used to determine these three correlation scores may be more precise but less efficient than the similarity measure used by the stereo matching hardware. For instance, if the stereo matching hardware uses an 8-bit census feature over a 3×3 block size, a 48-bit census feature over a 7×7 block size may be computed for the candidate matching pixel and each of its neighbors.

Block 810 includes determining whether the candidate matching pixel is better correlated to the target pixel than each of the left neighboring pixel of the candidate matching pixel and the right neighboring pixel of the candidate matching pixel based on the correlation scores. In some cases, the candidate matching pixel identified by the stereo matching hardware may not be the best match using correlation scores computed with a more nuanced input feature.

If the candidate matching pixel is better correlated to the target pixel than each of the left neighboring pixel of the candidate matching pixel and the right neighboring pixel of the candidate matching pixel, block 812 includes determining a disparity value between the target pixel from the first image and the given row of the second image based on an interpolation of the correlation scores. In this case, the candidate matching pixel may be used as a center pixel for sub-pixel interpolation using the calculated correlation scores.

If a neighboring pixel of the candidate matching pixel is better correlated to the target pixel than the candidate matching pixel, block 814 includes determining a correlation score between the target pixel and a second neighboring pixel of the neighboring pixel that is opposite the candidate matching pixel based on the similarity measure. In this case, the candidate matching pixel may not be used as a center pixel for sub-pixel interpolation. Instead, the neighboring pixel may be used as the center pixel. At block 816, the system may determine the disparity value between the target pixel from the first image and the given row of the second image based on an interpolation of the second correlation scores for the neighboring pixel, the second neighboring pixel, and the candidate matching pixel.

Block 818 includes provide the disparity value between the target pixel from the first image and the given row of the second image. Operations 800 may therefore leverage the efficiency of stereo matching hardware to search for candidate matching pixels without sacrificing accuracy by performing sub-pixel interpolation with separately calculated correlation scores in software.

It should be understood that arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
   receiving a first image from a first imager and a second image from a second imager;
   determining, based on a first similarity measure, first correlation scores between a target pixel from the first image and respective pixels from a given row of the second image;
   identifying a candidate matching pixel to the target pixel from the given row of the second image based on the first correlation scores;
   after identifying the candidate matching pixel, determining, based on a second similarity measure, second correlation scores between the target pixel and each of the candidate matching pixel, a left neighboring pixel of the candidate matching pixel, and a right neighboring pixel of the candidate matching pixel;
   determining a location between neighboring pixels in the second image at which an interpolation has a local minimum or maximum value,
   wherein, when the second correlation scores indicate that the candidate matching pixel is better correlated to the target pixel than each of the left neighboring pixel and the right neighboring pixel of the candidate matching pixel, the interpolation is fit to the second correlation scores of the candidate matching pixel, the left neighboring pixel, and the right neighboring pixel,
   and wherein, when the second correlation scores indicate that a neighboring pixel of the candidate matching pixel is better correlated to the target pixel than the candidate matching pixel, (i) a second correlation score is determined between the target pixel and a second neighboring pixel of the neighboring pixel that is opposite the candidate matching pixel in the second image and (ii) the interpolation is fit to the second correlation scores of the neighboring pixel, the second neighboring pixel, and the candidate matching pixel; and
   based on the determined location between neighboring pixels in the second image, determining a disparity value indicating how far apart a portion of an environment represented by the target pixel appears between the first image and the second image.

2. The method of claim 1, wherein determining the second correlation scores based on the second similarity measure comprises using a first block size to determine a first census feature and wherein determining the first correlation scores based on the first similarity measure comprises using a second block size to determine a second census feature, wherein the second block size is larger than the first block size.

3. The method of claim 2, wherein the first block size comprises a 5×5 window, and wherein the second block size comprises a 7×7 window.

4. The method of claim 1, wherein the first similarity measure comprises a first census feature having a first feature size, and wherein the second similarity measure comprises a second census feature having a second feature size that is greater than the first feature size.

5. The method of claim 1, wherein the interpolation is a linear V-interpolation.

6. The method of claim 1, wherein the interpolation is a quadratic interpolation.

7. The method of claim 1, further comprising:
   determining a disparity map between the first image and the second image based on the disparity value; and
   providing the disparity map between the first image and the second image.

8. The method of claim 1, further comprising:
   determining a depth map of a portion of the environment of the first imager and the second imager based on the disparity value; and
   providing the depth map of the portion of the environment.

9. The method of claim 1, further comprising:
   determining a distance to an object in the environment of the first imager and the second imager based on the disparity value; and
   providing the distance to the object in the environment.

10. A system comprising:
    a first imager;
    a second imager; and
    a control system configured to:
      receive a first image from the first imager and a second image from the second imager;
      determine, based on a first similarity measure, first correlation scores between a target pixel from the first image and respective pixels from a given row of the second image;
      identify a candidate matching pixel to the target pixel from the given row of the second image based on the first correlation scores;

after identifying the candidate matching pixel, determine, based on a second similarity measure, second correlation scores between the target pixel and each of the candidate matching pixel, a left neighboring pixel of the candidate matching pixel, and a right neighboring pixel of the candidate matching pixel;

determine a location between neighboring pixels in the second image at which an interpolation has a local minimum or maximum value, wherein, when the second correlation scores indicate that the candidate matching pixel is better correlated to the target pixel than each of the left neighboring pixel and the right neighboring pixel of the candidate matching pixel, the interpolation is fit to the second correlation scores of the candidate matching pixel, the left neighboring pixel, and the right neighboring pixel, and wherein, when the second correlation scores indicate that a neighboring pixel of the candidate matching pixel is better correlated to the target pixel than the candidate matching pixel, (i) a second correlation score is determined between the target pixel and a second neighboring pixel of the neighboring pixel that is opposite the candidate matching pixel in the second image and (ii) the interpolation is fit to the second correlation scores of the neighboring pixel, the second neighboring pixel, and the candidate matching pixel; and based on the determined location between neighboring pixels in the second image, determine a disparity value indicating how far apart a portion of an environment represented by the target pixel appears between the first image and the second image.

11. The system of claim 10, wherein the first imager and the second imager are aligned at a same height.

12. A non-transitory computer readable medium having stored therein instructions executable by one or more processors to cause a computing system to perform functions comprising:

receiving a first image from a first imager and a second image from a second imager;

determining, based on a first similarity measure, first correlation scores between a target pixel from the first image and respective pixels from a given row of the second image;

identifying a candidate matching pixel to the target pixel from the given row of the second image based on the first correlation scores;

after identifying the candidate matching pixel, determining, based on a second similarity measure, second correlation scores between the target pixel and each of the candidate matching pixel, a left neighboring pixel of the candidate matching pixel, and a right neighboring pixel of the candidate matching pixel;

determining a location between neighboring pixels in the second image at which an interpolation has a local minimum or maximum value, wherein, when the second correlation scores indicate that the candidate matching pixel is better correlated to the target pixel than each of the left neighboring pixel and the right neighboring pixel of the candidate matching pixel, the interpolation is fit to the second correlation scores of the candidate matching pixel, the left neighboring pixel, and the right neighboring pixel, and wherein, when the second correlation scores indicate that a neighboring pixel of the candidate matching pixel is better correlated to the target pixel than the candidate matching pixel, (i) a second correlation score is determined between the target pixel and a second neighboring pixel of the neighboring pixel that is opposite the candidate matching pixel in the second image and (ii) the interpolation is fit to the second correlation scores of the neighboring pixel, the second neighboring pixel, and the candidate matching pixel; and based on the determined location between neighboring pixels in the second image, determining a disparity value indicating how far part a portion of an environment represented by the target pixel appears between the first image and the second image.

13. The method of claim 1, further comprising controlling operation of a robotic device based on the determined disparity value.

14. The system of claim 10, wherein the first imager and the second imager are coupled to a robotic device, and wherein the control system is configured to control the robotic device based on the determined disparity value.

15. The method of claim 1, wherein the second similarity measure involves sampling the first image and the second image with a greater pixel block size than the first similarity measure.

16. The method of claim 1, wherein the first similarity measure is more efficient to compute than the second similarity measure in terms of time or space requirements.

* * * * *